(12) United States Patent
Isaacs et al.

(10) Patent No.: US 11,842,731 B2
(45) Date of Patent: Dec. 12, 2023

(54) METHOD AND SYSTEM FOR EXECUTING AN ACTION FOR A USER BASED ON AUDIO INPUT

(71) Applicant: salesforce.com, inc., San Francisco, CA (US)

(72) Inventors: Charles Hart Isaacs, Annapolis, MD (US); Vala Afshar, Burlington, MA (US); Bruce Richardson, Chestnut Hill, MA (US)

(73) Assignee: Salesforce, Inc., San Francisco, CA (US)

( * ) Notice: Subject to any disclaimer, the term of this patent is extended or adjusted under 35 U.S.C. 154(b) by 211 days.

(21) Appl. No.: 16/951,155

(22) Filed: Nov. 18, 2020

(65) Prior Publication Data

US 2021/0210090 A1 Jul. 8, 2021

Related U.S. Application Data

(60) Provisional application No. 62/957,664, filed on Jan. 6, 2020.

(51) Int. Cl.
| | | |
|---|---|---|
| *G10L 15/22* | (2006.01) | |
| *G06F 3/16* | (2006.01) | |
| *G01C 21/36* | (2006.01) | |
| *G10L 15/08* | (2006.01) | |

(52) U.S. Cl.
CPC .......... *G10L 15/22* (2013.01); *G01C 21/3608* (2013.01); *G06F 3/167* (2013.01); *G10L 15/08* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 2011/0098918 A1* | 4/2011 | Siliski | ..................... | H04M 1/04 701/533 |
| 2013/0275164 A1* | 10/2013 | Gruber | ..................... | G10L 17/22 705/5 |
| 2015/0106096 A1* | 4/2015 | Toopran | ................ | G10L 15/193 704/244 |
| 2015/0278370 A1* | 10/2015 | Stratvert | ........... | G06F 16/90332 707/766 |
| 2016/0070533 A1* | 3/2016 | Foster | ..................... | G10L 15/22 704/275 |
| 2016/0372112 A1* | 12/2016 | Miller | .................... | H04L 51/066 |

(Continued)

*Primary Examiner* — Jonathan C Kim
(74) *Attorney, Agent, or Firm* — Sterne, Kessler, Goldstein & Fox P.L.L.C.

(57) ABSTRACT

The method system described herein is configured to identify and execute a next recommended action for a user based on the user's audio input. In an embodiment, the system is configured to receive audio input from the user and convert the audio input into a string. The system may identify an attribute associated with the user. The system may identify a type of action based on the string. The system may query a data repository using the attribute associated with the user to retrieve information associated with the type of action. The system may identify a recommended action for the user based on the information associated with the type of action. The system may then execute the recommended action for the user.

17 Claims, 14 Drawing Sheets

(56) References Cited

U.S. PATENT DOCUMENTS

| | | | |
|---|---|---|---|
| 2017/0186315 A1* | 6/2017 | Glasgow | A61B 5/0205 |
| 2017/0247000 A1* | 8/2017 | Ricci | B60R 16/037 |
| 2018/0096681 A1* | 4/2018 | Ni | G10L 15/063 |
| 2019/0147880 A1* | 5/2019 | Booker | G06F 3/167 |
| | | | 704/251 |
| 2019/0180744 A1* | 6/2019 | Lee | G10L 15/26 |
| 2020/0020331 A1* | 1/2020 | Kim | G10L 15/30 |
| 2020/0051559 A1* | 2/2020 | Park | G06F 3/167 |
| 2020/0265048 A1* | 8/2020 | Dotan-Cohen | G06F 16/24522 |
| 2021/0104232 A1* | 4/2021 | Lee | G06N 3/08 |
| 2021/0199458 A1* | 7/2021 | Aggarwal | G06N 5/022 |
| 2021/0210090 A1* | 7/2021 | Isaacs | G06F 3/167 |
| 2022/0115016 A1* | 4/2022 | Whalin | G10L 15/08 |

* cited by examiner

Home ▼ Accounts ▼ Leads ▼ Contacts ▼ Assets ▼ Cases .... CC Carts ▼ CC Admin ▼ CC Sellers ▼ CC Products ▼ Calendar CarResponse ▼ More ▼

34 items • Sorted by Created Date • Filtered by all cc products • Updated a few seconds ago

| | Create... ▼ | Product Name ▼ | SKU ▼ | Product T... ▼ | Product S... ▼ | ShortDescRT ▼ | SEQ Title ▼ | Product W... ▼ |
|---|---|---|---|---|---|---|---|---|
| 1 | 12/7/2019... | Bacon Gouda Sand... | B-12347 | Product | Released | This is a delicious san... | sandwiches | 4.50 |
| 2 | 12/7/2019... | Double Smoked B... | B-12346 | Product | Released | This is a delicious san... | sandwiches | 4.50 |
| 3 | 12/7/2019... | Chorizon Breakfast... | B-12345 | Product | Released | This is a delicious san... | sandwiches | 6.11 |
| 4 | 10/16/2019... | Starbucks Frappucc... | STAR-1-122 | Product | Released | Starbucks Frappuccino | Coffee | 5.12 |
| 5 | 10/16/2019... | Starbucks Pumpkin... | STAR-11-01 | Product | Released | Starbucks Nitro Cold Brew | Coffee | |
| 6 | 8/26/2019... | CIRRUS15 | CIRRUS15 | Coupon | Released | | | |
| 7 | 8/26/2019... | Product B | 46372818 | Product | Released | Lorem ipsum dolor sit a... | Product B | |
| 8 | 8/26/2019... | Product C | 46372817 | Product | Released | Lorem ipsum dolor sit a... | Product C | 3.52 |
| 9 | 8/26/2019... | Starbucks Doppio E... | WTIN-AS... | Product | Released | | Coffee | |
| 10 | 8/26/2019... | Congratulation! Del... | WT-ASM... | Product | Released | The Contratulations! Del... | Congratulat... | |
| 11 | 8/26/2019... | Product A | 46272819 | Product | Released | Lorem ipsum dolor sit a... | Product A | |
| 12 | 8/26/2019... | Fields of Vegas for... | B-2000 | Product | Released | Inspired by the colorful... | Fields of Eur... | |
| 13 | 8/26/2019... | Starter Kit | A-5000 | Kit | Released | This kit is designed to... | Starter Kit | |
| 14 | 8/23/2019... | Fields of France for... | C-100 | Product | Released | Inspired by the colorful... | Seasonal | |

FIG. 8A

Home ▼ Accounts ▼ Leads ▼ Contacts ▼ Assets ▼ Cases ... CC Carts ▼ CC Admin ▼ CC Sellers ▼ CC Products ▼ Calendar CarResponse ▼ More ▼

9 items • Sorted by Seller Name • Filtered by all cc sellers • Updated a few seconds ago

| | Seller Name | streetAddress | SKU | Product T... | Product S... | ShortDescRT | SEQ Title | Product W... |
|---|---|---|---|---|---|---|---|---|
| 1 | Nevada Flowers ... | 2446 Las Vegas Blvd... | | 36.1698000 | 115.1398300 | 6701112 | http://harmantosfapi.h... | 6507992978 | https://www.startbucks... |
| 2 | Starbucks 121123 | 10 Market Street | | 37.7682220 | 122.4222220 | 121123 | https://encrypted-tbn... | 6507992978 | https://www.startbucks... |
| 3 | Starbucks 129212 | 210 Market Street | | 37.7599999 | 122.5288888 | 129212 | https://encrypted-tbn... | 6507992978 | https://www.startbucks... |
| 4 | Starbucks 1711131 | 210 Market Street | | 37.7644440 | 122.4244440 | 1711131 | https://encrypted-tbn... | 6507992978 | https://www.startbucks... |
| 5 | Starbucks 1784821 | 22 Market Street | | 37.7633330 | 122.4233330 | 1784821 | https://encrypted-tbn... | 6507992978 | https://www.startbucks... |
| 6 | Starbucks 21300014 | 1251 S Grand Ave | | 34.0393600 | 118.2642000 | 21300012 | https://encrypted-tbn... | 6507992978 | https://www.startbucks... |
| 7 | Starbucks 4015 | 401 W 5th Street | | 34.0489700 | 118.2518400 | 21300012 | https://encrypted-tbn... | 6507992978 | https://www.startbucks... |
| 8 | Starbucks 66544 | 1312 Las Vegas Boul... | | 36.1698000 | 115.1396000 | 66544 | https://encrypted-tbn... | 6507992978 | https://www.startbucks... |
| 9 | Starbucks 67010 | 101 Las Vegas Boule... | | 36.1700000 | 115.1400000 | 67010 | https://encrypted-tbn... | 6507992978 | https://www.startbucks... |

METHOD AND SYSTEM FOR EXECUTING AN ACTION FOR A USER BASED ON AUDIO INPUT

CROSS REFERENCE TO RELATED APPLICATIONS

This application claims priority to U.S. Provisional Application No. 62/957,664, filed on Jan. 6, 2020, the contents of which are incorporated herein in their entirety.

BACKGROUND

Territory sales employees often travel to accounts for possible sales opportunities. This requires driving or commuting to the accounts. The territory sales employees may find it difficult to schedule their appointments with accounts while they are driving efficiently. Furthermore, it may be inefficient for a territory sales employee to stop somewhere and to determine which account to schedule the next appointment. This may require multiple executing queries resulting in losing time that the territory sales employee could be used to meet an account. Furthermore, the territory sales employee may select an account that is in a location hard to reach for the territory sales employee, or the account is not as good of a sales opportunity as another account, as the territory sales employee may not have all the data available at their fingertips.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

FIGS. 8A-8B are lists of products that can be purchased at various vendors for the clients.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for executing an action for a user based on audio input.

As described above, territory sales employees often travel to locations of accounts for possible sales opportunities. Accounts may be potential clients or customers. This requires driving or commuting to the account. Often times, appointments with accounts are canceled or run shorter than expected. This may create an opportunity for the territory sales employee to schedule an appointment with an account before another appointment. However, attempting to determine which account to schedule the appointment with may be an inefficient and error-prone process. The territory sales employee may have to attempt multiple queries to identify an account, which can be a time-consuming process. Furthermore, the territory sales employee may identify an account that may create an inefficient route for the territory sales employee or may identify an account that is not a great of a sales opportunity, as the relevant data may not be available to the territory sales employee.

The territory sales employee may also need to execute last-minute tasks for accounts. For example, the territory sales employee may need to make reservations at a restaurant, order gifts (e.g., flowers or fruit baskets), order coffee, or the like. Determining where to make reservations, or what type of gift to order, or where to order coffee, can be a difficult and sometimes impossible task for the territory sales employee while driving or commuting to their next appointment.

The method and system described herein are configured to identify and execute a next recommended action for a user based on the user's audio input. In an embodiment, the system is configured to receive audio input from the user and convert the audio input into a string. The system may identify a type of action based on the string. The system may query a data repository using the attribute associated with the user to retrieve information associated with the type of action. The system may identify a recommended action for the user based on the information associated with the type of action. The system may then execute the recommended action for the user.

As an example, the executed action may be scheduling the next appointment, ordering a gift for the account, making reservations at a restaurant, ordering coffee for the account, or the like. In this regard, the system may solve the technical problem of executing actions for a user by identifying a recommended action using audio input received from the user, without having the user to execute multiple queries or encounter user-based errors.

Figure 1:
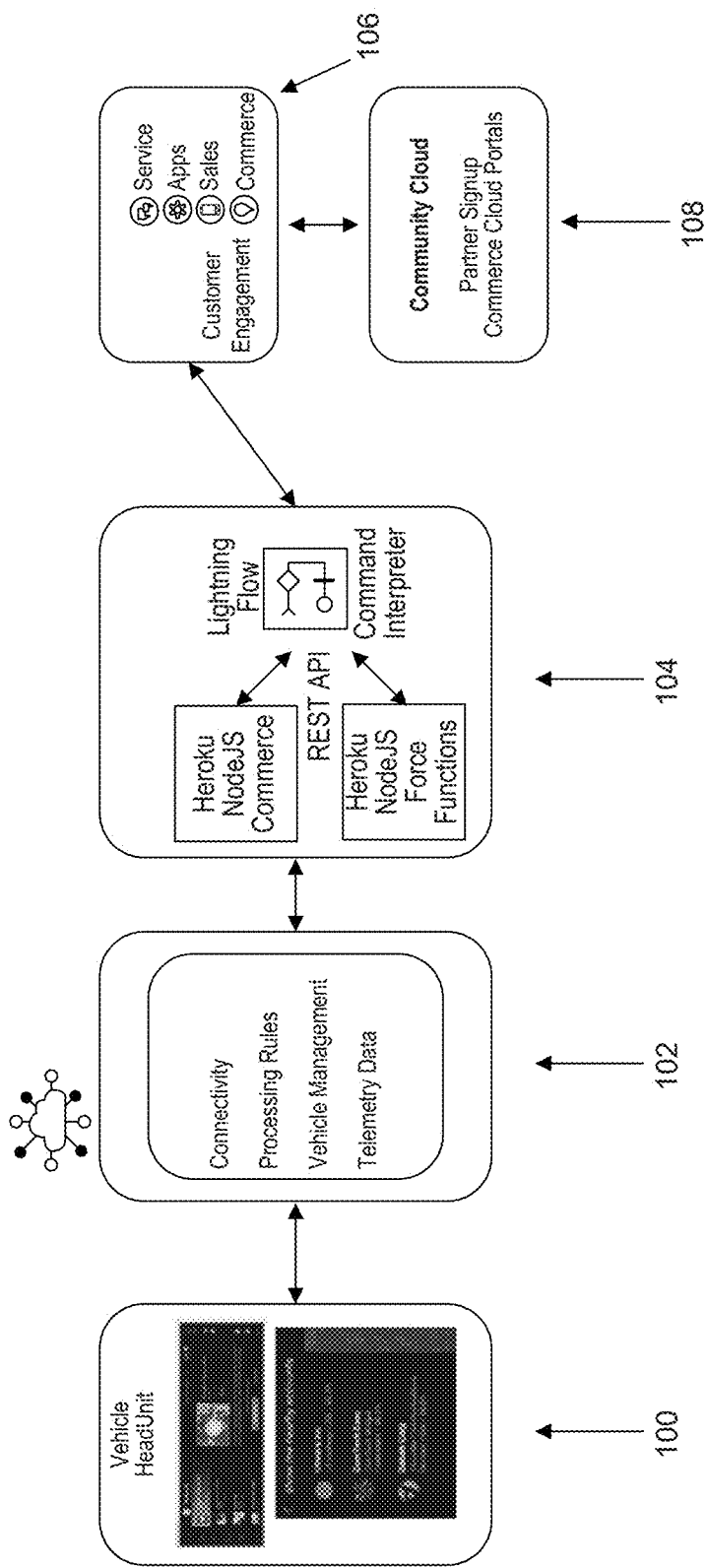
FIG. 1 is a block diagram of the architecture for executing an action for a user based on audio input.

FIG. 1 is a block diagram of the architecture for executing an action for a user based on audio input. In an embodiment, a device 100 may be embodied as a head unit installed in a vehicle. The device 100 may include a display and a microphone to capture audio input. Furthermore, the device 100 may be configured to execute a voice request application 102.

The voice request application 102 may be configured to receive and process audio input and capture vehicle and telemetry data. The voice request application 102 may also provide connectivity to a platform for executing an action based on the audio input. For example, in response to executing the voice request application 102, the microphone of the device 100 may become operational. A user may provide audio input, which is captured by the microphone. The audio input may be associated with an action to be executed. The audio input may be associated with a commerce-based request or a force function based request. A commerce-based request may include purchasing coffee, gifts, flowers, or the like. Force function based requests may include scheduling new appointments, navigating to a new account, or the like. The telemetry data may include a geolocation or GPS data of the device 100. The voice request application 102 may convert the audio input into a string. The voice request application may use speech recognition software, such as NUANCE (developed by NUANCE COMMUNICATIONS located in Burlington, Mass.). Based on the content of the string, the voice request application 102 may determine whether to transmit the string to platform 104. The voice request application 102 may transmit the string and telemetry data to the platform 104 as an HTTP request.

In some embodiments, the voice request application 102 may also transmit information about the service of a vehicle (e.g., vehicle management data) to the platform 104. For example, the service information may include vehicle information, such as information about the vehicle's brake pads, oil temperature, tune-up, or the like.

In some embodiments, the voice request application 102 may transmit the audio input as an audio file to platform 104. Platform 104 may convert the audio file to a string using speech-to-text capabilities. The string may be a transcription of the user's spoken word.

The platform 104 may include a commerce node 110, force function node 112, and a workflow engine 114. The platform 104 may parse the string to determine whether the request included in the string is a commerce-based request (e.g., "I want to purchase flowers.") or a force function-based request (e.g., "Find me my next sales account."). In response to determining the request is a commerce-based request, the string is forwarded to the commerce node. Alternatively, the string is forwarded to the force function node. Each of the nodes may identify the request from the string and may format the request so that the workflow engine 114 forwards the request to a portion of a workflow that corresponds with the request along with the telemetry data. The commerce and force function node may communicate with the workflow engine 114 using the REST API.

The workflow engine 114 may include a command interpreter. The command interpreter may determine whether the type of request. For example, the type of request may include service, applications, sales, and commerce. The workflow engine 114 may route the request to the appropriate components to process the request. The components may be located on the engagement platform 104. The workflow engine 114 may interface with an engagement platform 104 to execute the desired request. The engagement platform 104 may be part of the workflow implemented by the workflow engine 114.

The engagement platform 104 may interface with a community cloud platform 108 to complete commerce-based actions. The community cloud platform 104 may include information about interfacing with vendors to complete commerce-based actions. For example, in the event the action is ordering coffee from a coffee shop, the engagement platform 104 may interface with the community cloud platform 108 to order coffee from a coffee shop.

In some embodiments, various vendors may sign-up for the community cloud platform 108. This way, when if a user request is associated with purchasing coffee, the engagement platform may use the vehicle's geolocation data and use the vehicle's geolocation data to identify a coffee shop from the community cloud platform 108 closest to the vehicle geolocation data.

As another example, the request may be for purchasing flowers. The engagement platform 108 may interface with the community cloud platform 108 to identify vendors that have signed up with the community cloud platform 108 and sell flowers. The engagement platform 108 may use one of the vendors to complete the purchase.

In an embodiment, a user operating a vehicle may use the voice request application 102 to provide an audible statement associated with a request that is to be executed. As a non-limiting example, the requests may include but are not limited to navigate to nearest account, navigate to the best account, take me to an account, send a message to a contact at a company, and help me.

Figure 2A:
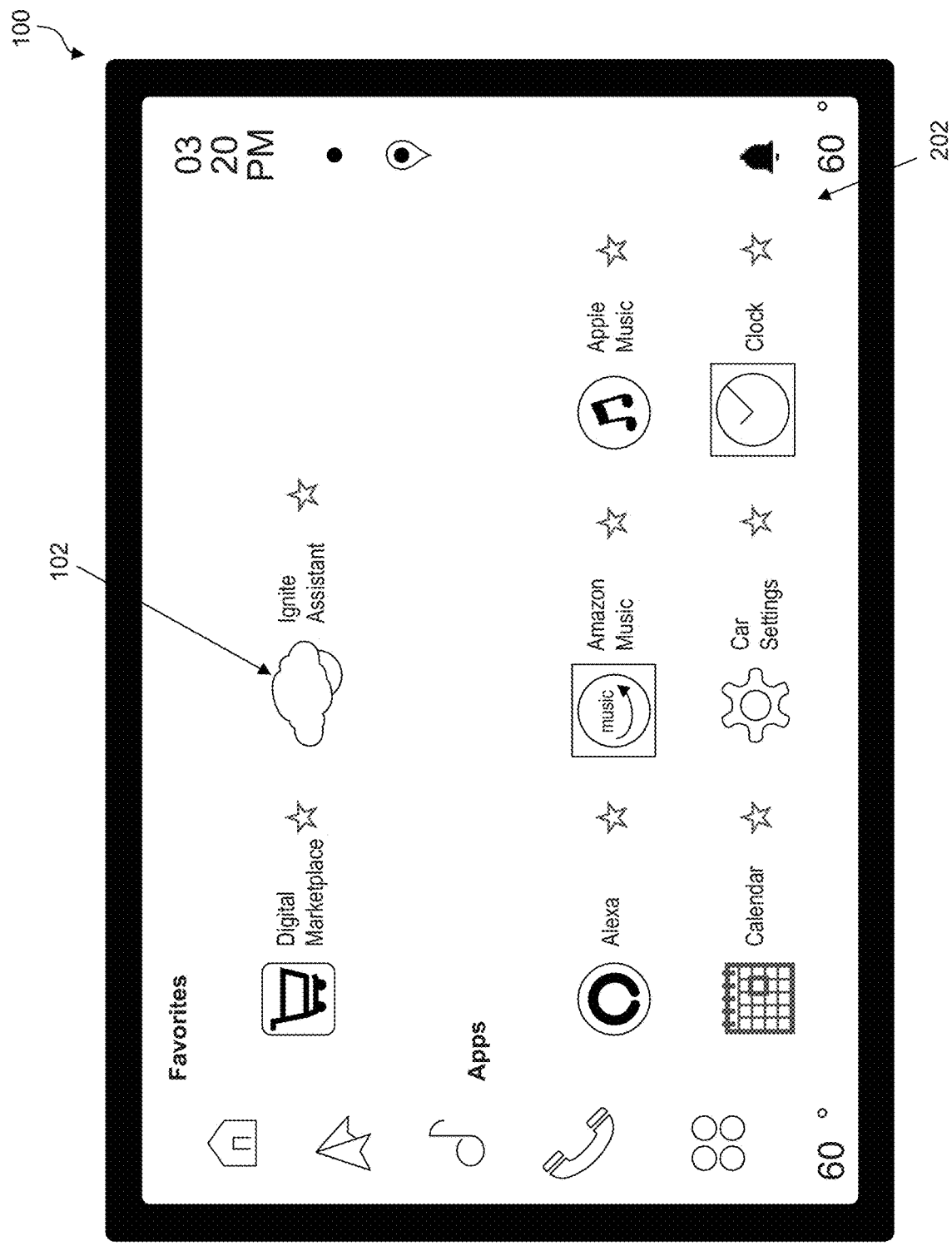
FIGS. 2A-2B is a block diagram of an example device for capturing audio input according to an example embodiment.
Figure 2B:
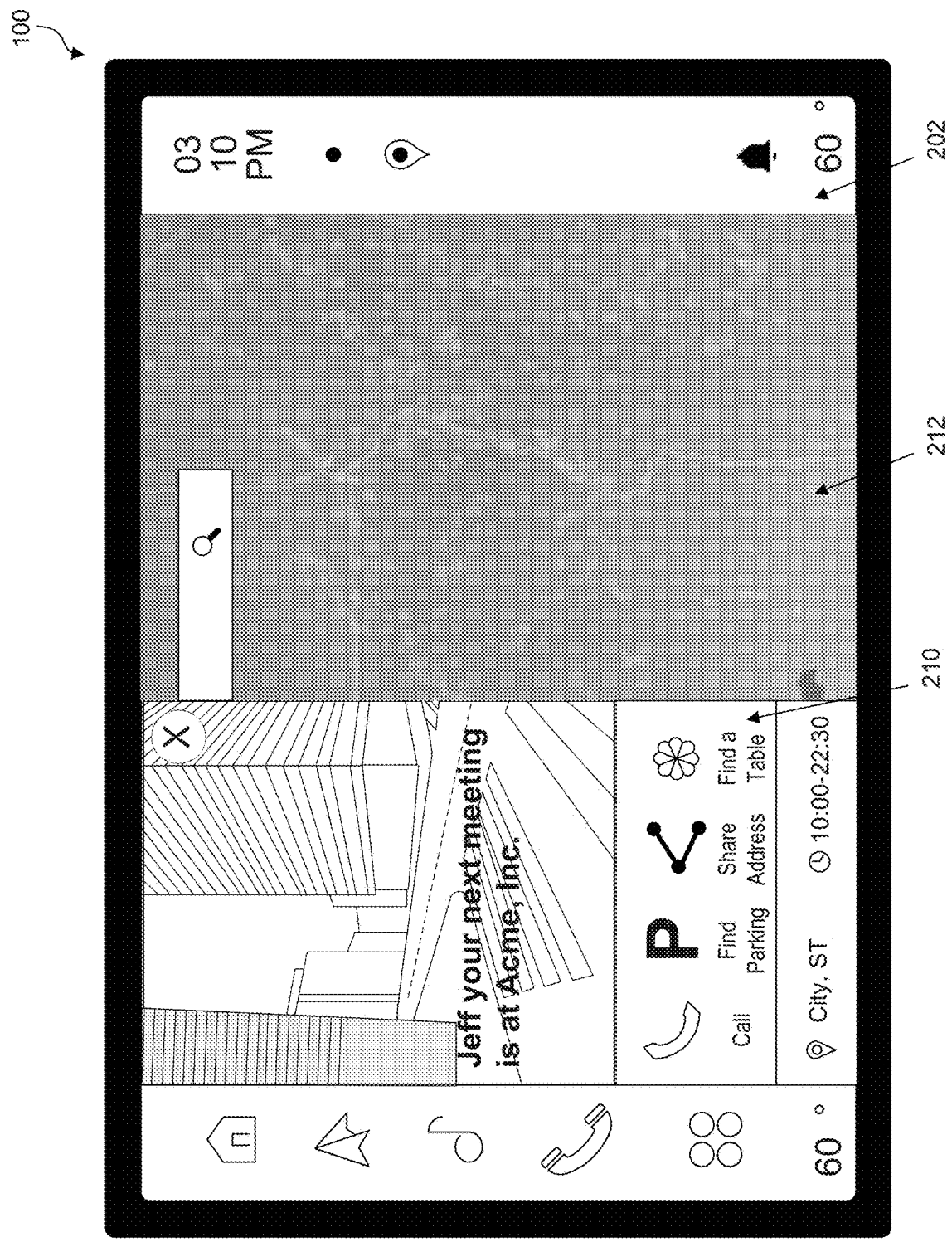

FIGS. 2A-2B is a block diagram of an example device 100 for capturing audio input according to an example embodiment. In an embodiment, the device 100 may be a vehicle head unit built in a dashboard. As a non-limiting example, the device 100 may be a HARMON device (developed by SAMSUNG). The device 100 may include a display, which renders a user interface 202, and a microphone. The user interface 202 may include the applications that may be executed by the device 100, including a voice request application 102. In some embodiments, the display may be a heads-up display or may utilize augmented reality technology.

The voice request application 102 may be executed by being actuated in response to receiving an input. For example, the display of the device 100 may be a touchscreen display. The voice request application 102 may be executed by touching the voice request application 102 being rendered on the display. In response to executing the voice request application 102, the microphone of the device 100 may become operational. In response to the microphone of the device 100 becoming operational, a visual indicator may be rendered over the voice request application 102. A user can provide audio input when the microphone becomes operational. The microphone can capture the audio input. The voice request application 102 converts the audio input into a string and transmits the string to the platform (e.g., platform 104, as shown in FIG. 1).

In some embodiments, the voice request application 102 may capture the audio input and transmit the audio input to the platform as an audio file. The platform may convert the audio file into a string.

As an example, the audio input may be a request. The request may be transmitted to the platform. The platform may process the request and execute an action based on the query.

As a non-limiting example, a user who is a territory sales employee may be operating a vehicle to navigate to accounts. The user may need to execute an action without having all the data necessary to execute the action. The user may need to schedule an appointment with an account. However, the user may not know with which account to schedule the appointment.

The user may execute the voice request application 102 on the device 100. The user may provide audio input to the voice request application 102. For example, the user may audibly state, "Please schedule my next appointment." The microphone of the device 100 may capture the audible statement. The voice request application 102 may transmit the audible statement to the platform. The platform may process this audible statement and execute an action based on the audible statement. For example, the platform may identify an account and schedule the user's next appointment with the account.

With reference to FIG. 2B, the result of the executed action may be rendered on the user interface 202 of the device 100. Continuing with the earlier example, a prompt 210 with the user's next appointment may be rendered on the user interface 202 along with a map 212. The prompt 210 may include the name of the account which whom the appointment is scheduled and options to call, find parking, share address, and find a table. The map 212 may render a route to the location of the next appointment.

In some embodiments, device 100 may output audio data indicating the result of the executed action. For example, the result of the executed action may be rendered on user interface 202. Device 100 may convert the text of the result of the executed action into audio data using "text-to-speech" software and output the audio data. As a non-limiting example, in the event the executed action is scheduling an appointment, the audio output from the device may include a confirmation message, such as "Your next appointment is scheduled for 3 PM in New York, N.Y."

Figure 3A:
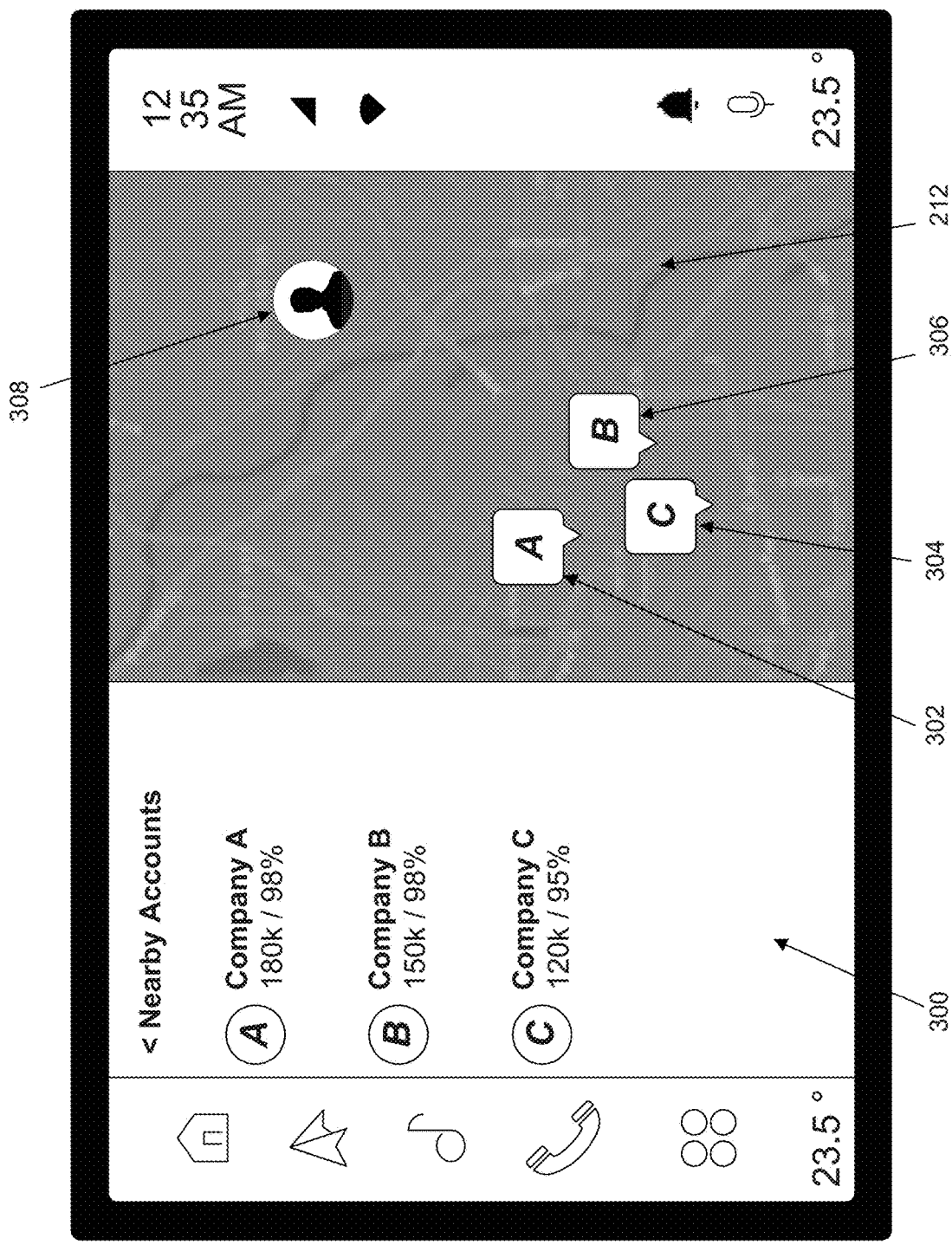
FIGS. 3A-3B are block diagrams of the user interface of the voice request application according to an example embodiment.
Figure 3B:
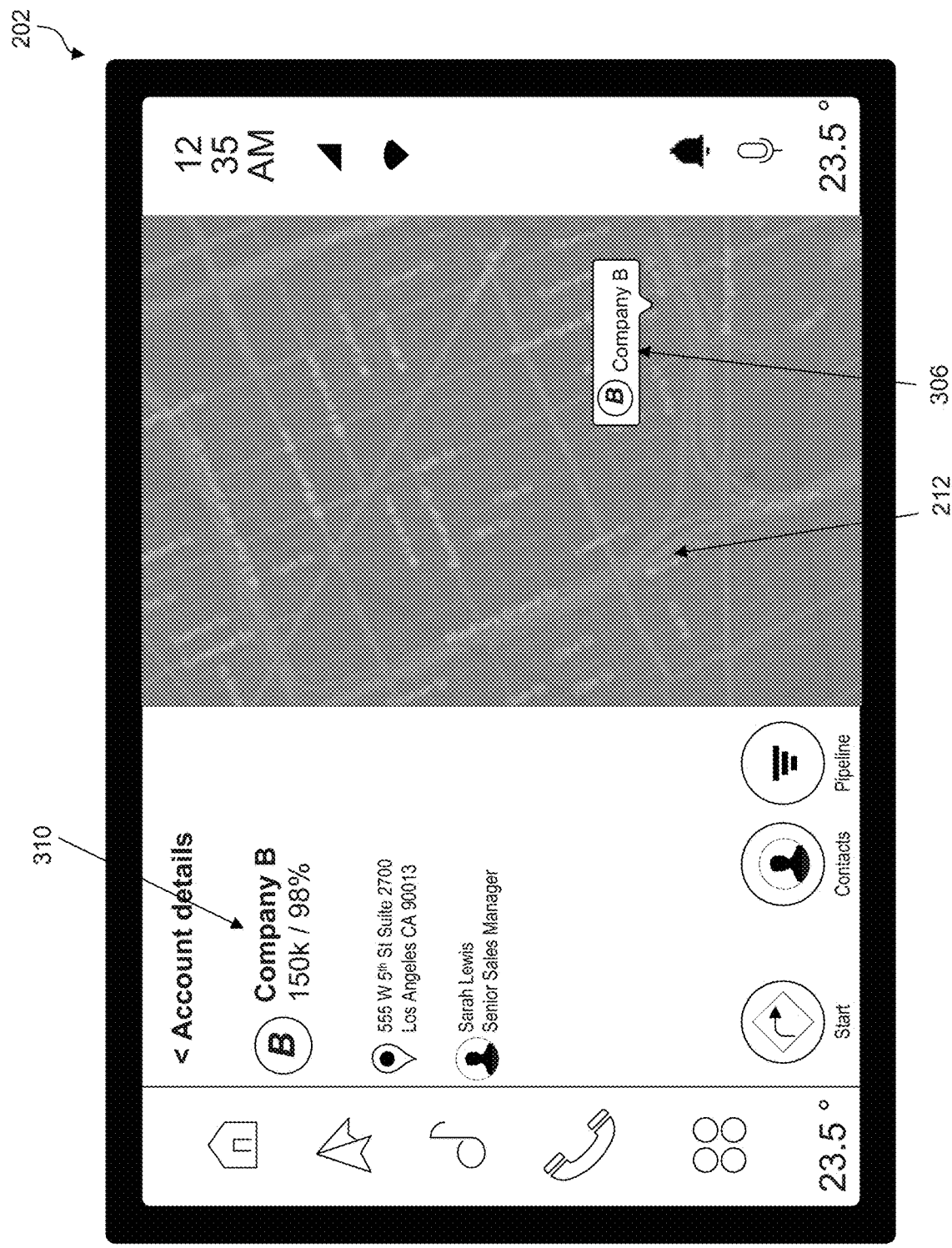

FIGS. 3A-3B are block diagrams of the user interface 202 of the voice request application 102. With reference to FIG. 3A, in an embodiment, in response to a user providing an audio input to schedule a new appointment with an account. The user interface 202 may render a list 300 of accounts. The list 300 may include company name, sales opportunity, and close percentage. Their location may be rendered on the map 212.

As a non-limiting example, the list 300 may include company A, company B, and company C. The location 302 of company A may be rendered on the map 212. The location 306 for company B may be rendered on the map 212. The location 304 of company C may be rendered on the map 212. The location 308 of the user (or vehicle) may be rendered on the map 212.

With reference to FIG. 3B, the user may select one of the three companies displayed on the user interface 202 to retrieve further information about the company. In this example, the user may select company B. The user interface 202 may render information 310 about company B. The information may include company B's name, sales opportunity, close percentage, address, contact information, or the like. The map 212 may render a location 306 of company B.

Figure 4:
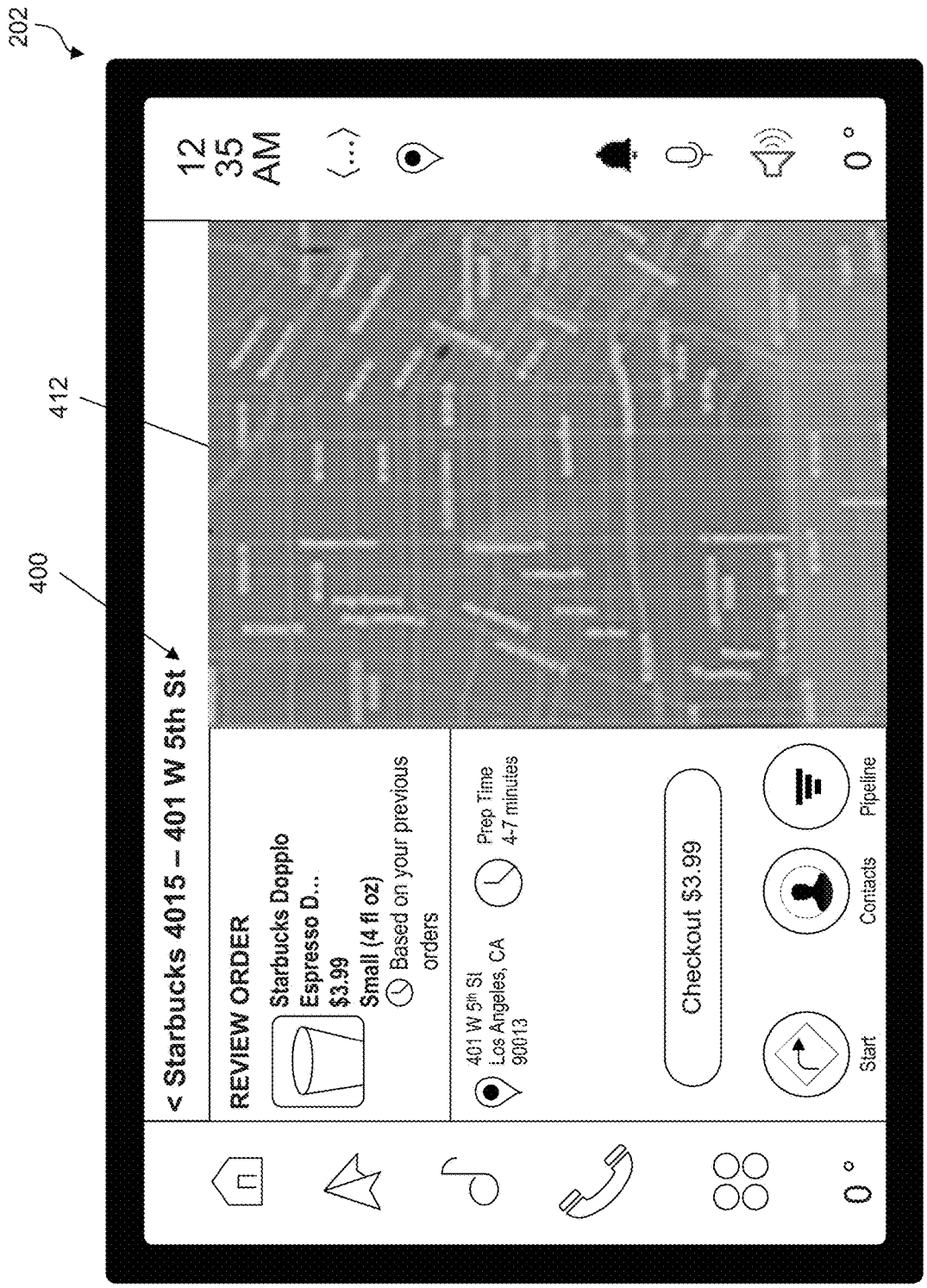
FIG. 4 is a block diagram of the user interface of the voice request application completing a commerce-based action.

FIG. 4 is a block diagram of the user interface 202 of the voice request application 102, completing a commerce-based action. In an embodiment, a user may provide an audio input for ordering coffee from a coffee shop. The platform may process the audio input and generate a coffee order based on the user's previous orders. The user interface 202 may render the order information 400. The order information may include the name of the coffee shop, items ordered, address of the coffee shop, estimated prep time, and a checkout button, including the amount due. The user interface 202 may also render a map 412, including a location of the coffee shop. In response to selecting the checkout button, a request may be transmitted to the platform. The platform may complete the purchase of the coffee.

Figure 5:
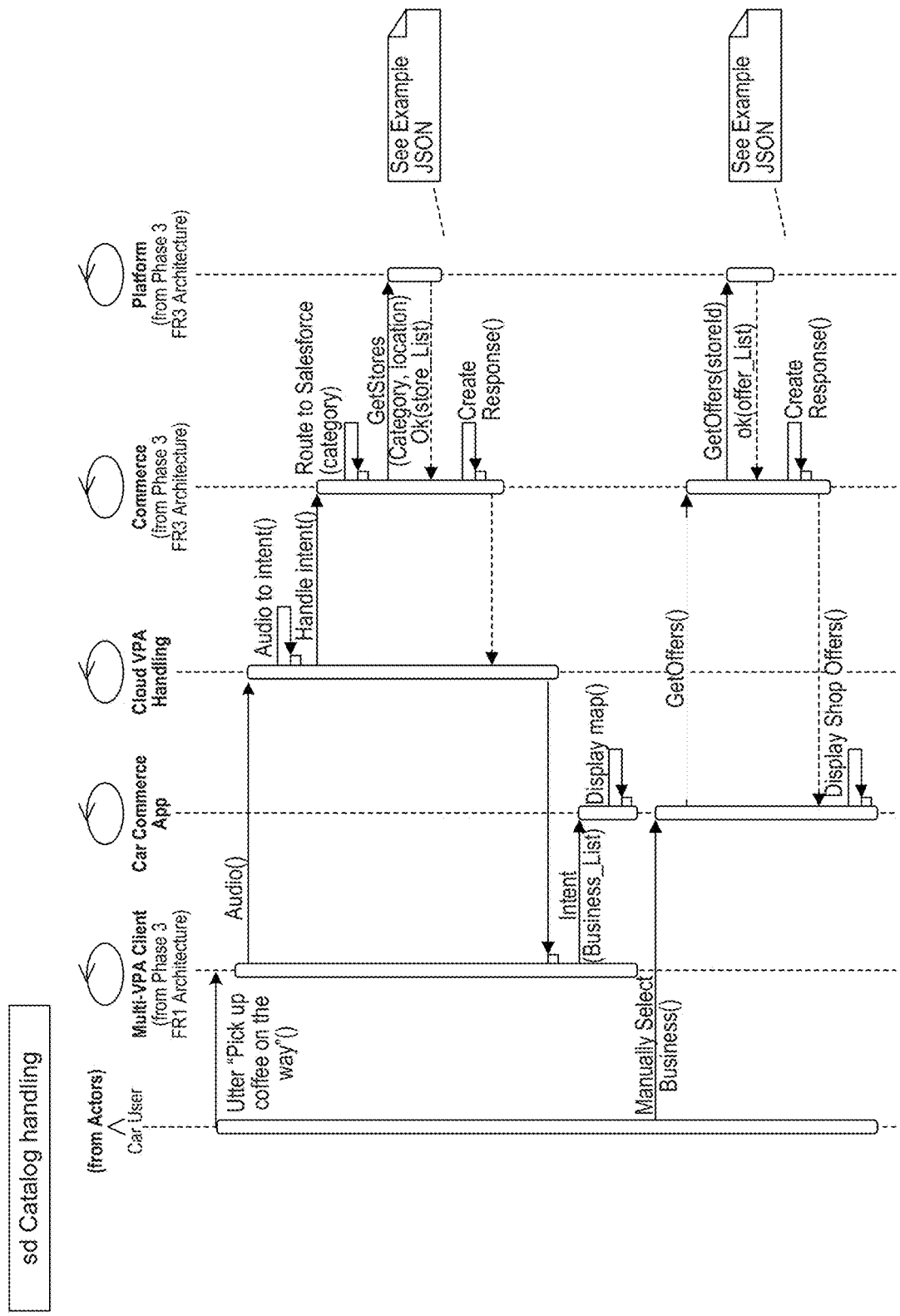
FIG. 5 is a diagram illustrating a flow of generating offers from the community cloud platform according to an example embodiment.

FIG. 5 is a diagram illustrating a flow of generating offers from the community cloud platform. The flow may include a user, voice recognition architecture, car commerce application, cloud VPA handling, commerce, and the platform (e.g., platform 104, as shown in FIG. 1). A user may make the audible statement "pick up coffee on the way." The device (e.g., device 100, as shown in FIG. 1) may capture the audio statement. The audio statement may be transmitted to the voice recognition architecture. The voice recognition architecture may be part of the device. The voice recognition architecture may transmit an audio file of the audio statement to the speech recognition handling operation. The speech recognition handling operation may convert the audio file of the audio statement into a string using speech recognition software. The speech recognition handling operation may be executed in a cloud computing environment. The speech recognition handling operation may transmit the string to a commerce operation.

The commerce operation may route the intent to a type of action to be executed by a platform. In this example, the intent is to order coffee, so the type of action (or category) is "buy coffee." Commerce operation may transmit a request to the platform to find the stores based on the location and the product being purchased (in this case, coffee). The platform may retrieve the coffee shops within a given vicinity of the location. The platform may transmit the retrieved coffee shops to commerce.

Commerce operation may transmit the retrieved coffee shops to speech recognition handling operations which may transmit the coffee shops to voice recognition architecture. The voice recognition architecture may transmit the coffee shops to the car commerce application, which may generate and display a map, including the coffee shops returned by the commerce operation.

The user may select a coffee shop from the retrieved coffee shop using the care commerce application. The car commerce application may transmit a get offers request to commerce. Commerce may transmit a get offers request to the platform, including the id of the selected coffee shop as a parameter. The platform may generate a list of offers of products for sale at the coffee shop and transmit the list of offers to commerce. Commerce may generate a response, including the list of offers, and transmit the response to the car commerce application. The car commerce application may display the response on the display of the device.

Figure 6:
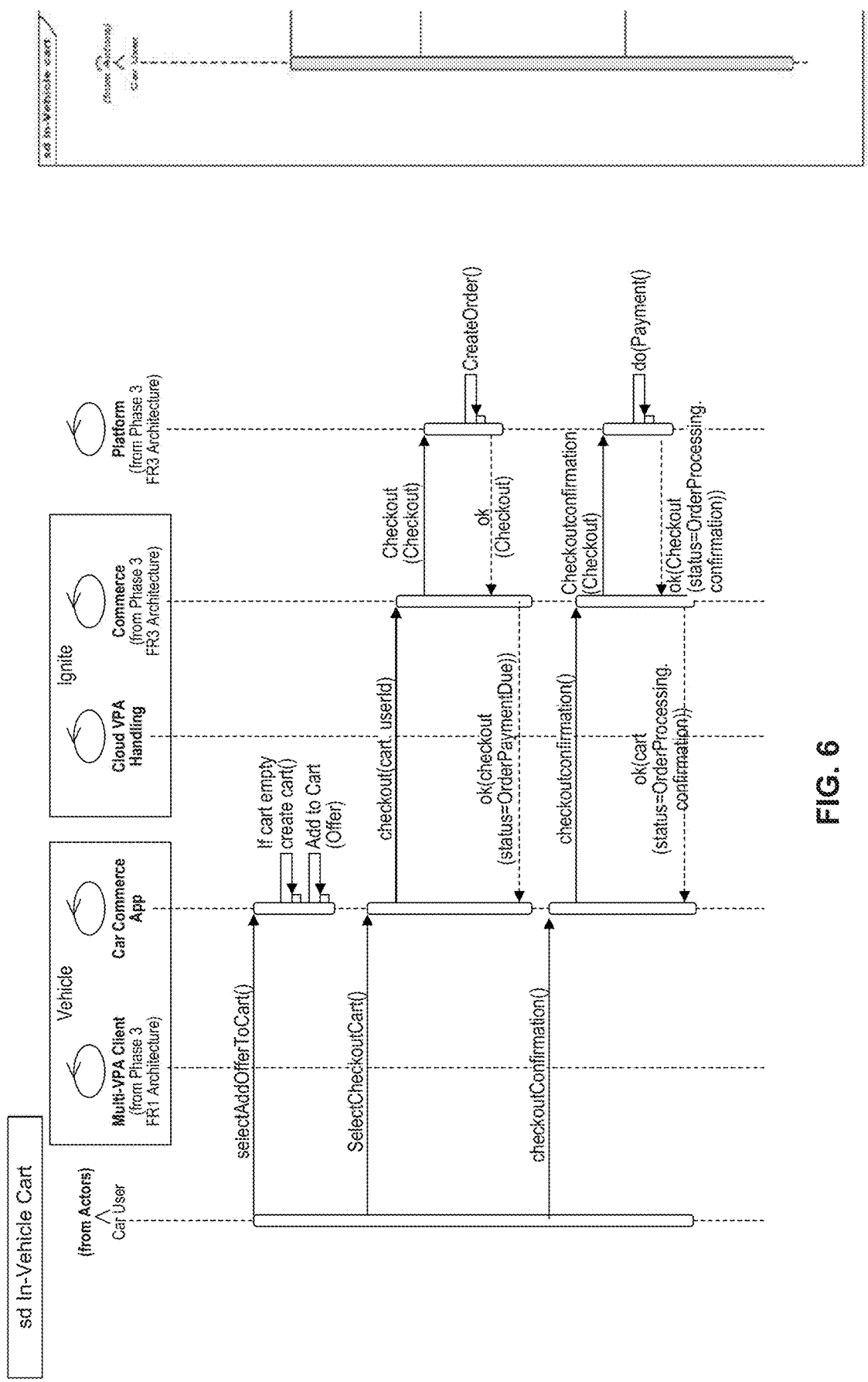
FIG. 6 is a diagram illustrating a flow of generating a shopping cart when executing commerce based actions according to an example embodiment.

FIG. 6 is a diagram illustrating a flow of generating a shopping cart when executing commerce-based actions. The flow may include the user, the vehicle, voice request application, and platform. The vehicle may include the device, as shown in FIG. 1. The device may include a voice recognition architecture and car commerce application. A user may select to add an offer of a product in a shopping cart while the user is in the vehicle. The car commerce application may receive the request for adding the product in the shopping cart. If the shopping cart is empty, one is created. If a shopping cart has already been created, the product is added to the shopping cart.

In response to the user selecting checkout, to complete the purchase of the products in the cart, the userID of the user and information about products in the cart may be transmitted from the car commerce application to the voice request application. The voice request application may push the checkout command to the platform. The platform may create an order and send a checkout message to the voice request application. The voice request application may send out a checkout message to the care commerce application. The checkout message may include the payment due.

The user may provide a payment device information for purchasing the products and transmit a confirmation of checkout to the car commerce application. The care commerce application may transmit the payment details and checkout confirmation to the voice request application. The voice request application may transmit the payment details and checkout confirmation to the platform. The platform may process the payment and send a confirmation of the order to the voice request application. The voice request application may send the confirmation to the car commerce application.

Figure 7:
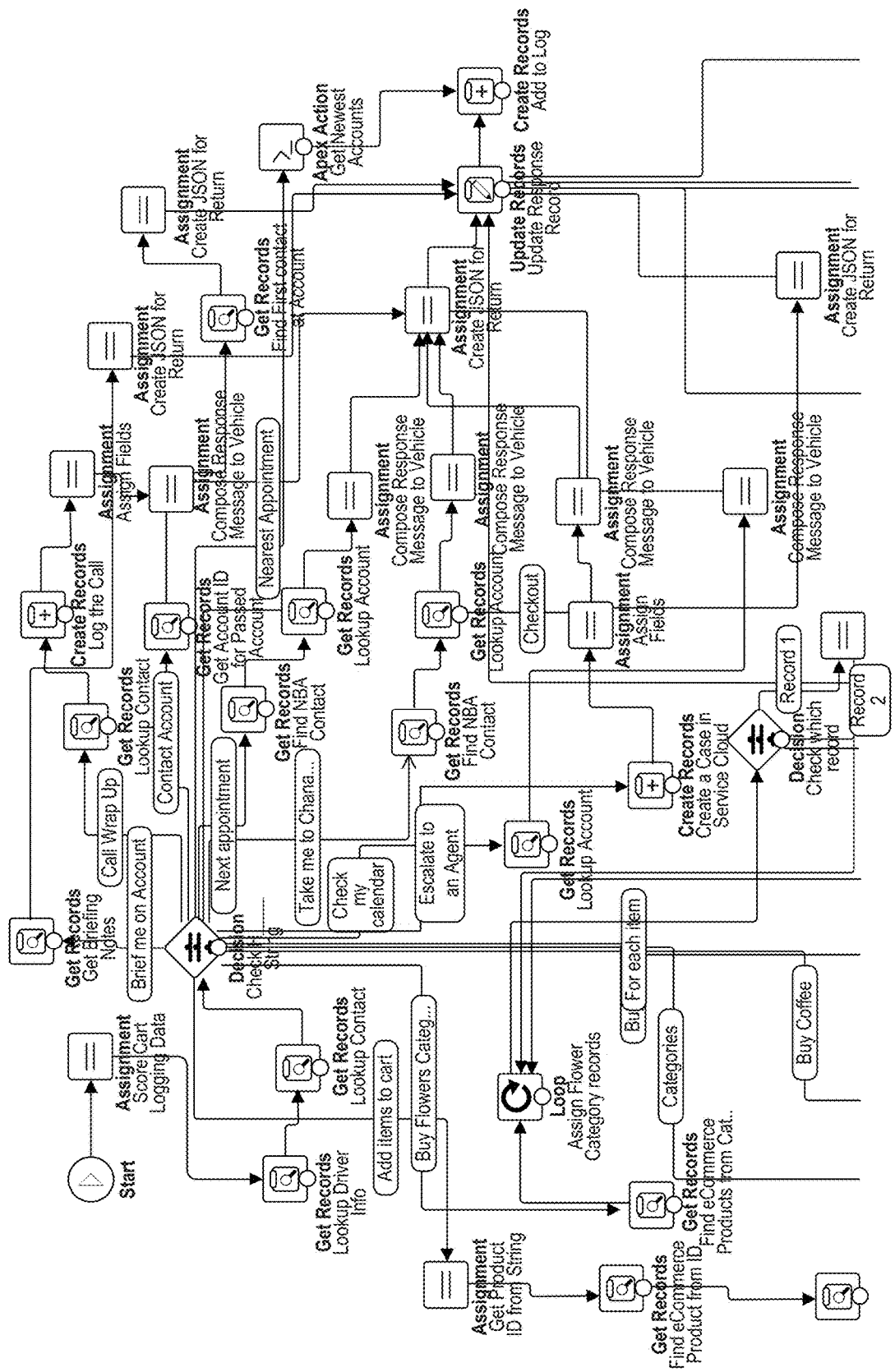
FIG. 7 is a diagram of a workflow for executing an action for a user based on audio input according to an example embodiment.

FIG. 7 is a diagram of a workflow for executing an action for a user based on audio input according to an example embodiment. A workflow engine may implement the workflow (e.g., the workflow engine 114, as shown in FIG. 1) The workflow may be made up of various components. In an embodiment, in response to a user executing the voice request application, the workflow may be initialized at the start component.

The workflow may proceed to a store call logging component. The store call logging component may initialize the microphone of the device so that the voice request application can receive the audio input from the user. The voice request application may receive an audio input from the user.

The workflow may proceed to a lookup driver information component. The lookup driver information component may retrieve information about the user operating the vehicle. As described above, the user may operate the voice request application while operating a vehicle. The look p driver information component may retrieve the records associated with the driver (user) from a data repository configured to store records about the user.

The workflow may proceed to lookup contact component. The lookup contact component may lookup contacts of the user. As described above, the user may be a territory sales employee. The lookup contact component may lookup accounts for the user.

The workflow may proceed to the decision component. The decision component may direct the workflow to proceed in a given direction based on the audio input received from the user. For example, in an embodiment, the decision component may receive a request generated using the user's audio input. Alternatively, the decision component may receive keywords from the user's audio input. The decision component may generate a request to be processed using the keywords. For example, the decision component may receive a request generated from the audio input, indicating that a new appointment is to be scheduled for the user. Alternatively, the decision component may receive keywords such as "appointment" or "schedule." The decision component may generate a request for scheduling a new appointment for the user. Either way, the decision component may identify a type of action tied to the audio input. The type of action may include call wrap up, next appointment, contact account, take me to a destination, escalate to agent, check my calendar, buy flowers, buy coffee, or the like.

As an example, the call wrap up action may be initialized in response to the user making an audible statement such as "wrap up my call" or "call wrap up." The decision component may receive a request for "wrapping up the user's call" or keywords such as "wrap up" and "call." The decision component may direct the workflow to the call wrap up action.

In response to initiating the call wrap up action, the workflow may proceed to a lookup contact component. The lookup contact component may retrieve information about an entity or person that just completed a call with the person. As described above, this may be an account. The lookup contact component may retrieve information about this entity or person.

After retrieving the information, the workflow may proceed to the log of the call component. The log the call component may generate a log of the call that just took place between the user and the entity or person. This may be generated based on a user providing audio feedback to the voice request application. For example, the user may audibly state, "I had a great call with account X. The sales opportunity with account X is greater than $200,000." The log the call component may generate a log, including these statements. Alternatively, log the call component may summarize the user's audible statements using natural language processing. The log can be created and saved in the appropriate data repository.

The next appointment action may be initiated based on the user making an audible statement such as "make my next appointment" or "create a new appointment." The decision component 110 may receive this audible statement as a transformed request, including a request to book the next appointment. Alternatively, the decision component 110 may receive keywords such as "next" and "appointment." Either way, the decision component 110 may identify that the type of action is the next appointment action.

In response to initiating the next appointment action, the workflow may proceed to the find NBA contact component. The find NBA contact component may find an entity or person with whom to schedule the next appointment with the user. The NBA contact component 226 may find accounts for the user based on the location of the user, traffic, account availability, deal potential, and proximity to points of interest for the user.

After finding accounts for the user, the workflow may proceed to lookup account component. The lookup account component may retrieve information about the accounts. The lookup account may filter out accounts for the next appointment based on the location of the user, traffic, account availability, deal potential (opportunity or lead score), and proximity to points of interest for the user, using the information about the accounts. An account may be identified for the next appointment for the user.

In an embodiment, a get nearest accounts component may retrieve the accounts closest to the user's geolocation. The nearest accounts component may compare the location of the user and the addresses of the accounts to determine the clients closest to the user's geolocation.

The take me to a destination action may be initialized in response to the user making audible statements such as "take me to my next appointment" or "take me to my next account." The decision component may receive a transformed request indicating that the user needs navigation instruction to their next appointment. Alternatively, the decision component may receive keywords such as "take me" or "navigate." Either way, the decision component may determine that the type of action is take me to a destination action.

In response to initializing the take me to a destination action, the workflow may proceed to a find NBA contact component. The find NBA contact component may retrieve the contact the user is scheduled to meet (e.g., the account).

After retrieving the contact, the user is scheduled to meet the workflow may proceed to a lookup account component. The lookup account component may look up information about the contact's account, such as address and time of appointment. The navigation instructions for reaching the location of the next appointment may be generated and provided to the user.

The escalate case to an agent action may be initialized in response to the user making audible statements such as "escalate case" or "send case to agent." The decision component may receive a transformed request indicating that the case needs to be escalated to an agent. Alternatively, the decision component may receive keywords such as "escalate" or "agent." Either way, the decision component may identify that the type of action is escalate case to agent.

In response to initializing the escalate case to agent action, the workflow may proceed to create a case in a data repository. The case may be a user attempting to troubleshoot some technical issues and needs to be resolved.

The check my calendar action may be initialized based on the user making audible statements such as "check my calendar" or "my calendar." The decision component may receive a transformed request to check the user's calendar. Alternatively, the decision component 110 may receive keywords such as "calendar" and "check." Either way, the decision component may determine that the type of action is to check my calendar.

In response to initializing the check my calendar action, the workflow may proceed to lookup contact component. The lookup contact component may look up the next scheduled appointments for the user.

The buy flowers action may be initialized based on the user making audible statements such as "purchase flowers for client x" or "buy flowers for client x" The decision component may receive a transformed request to purchase flowers for client x or may receive keywords such as "purchase," "flowers" or "client x." Either way, the decision component may determine that the type of action is buy flowers.

In response to initializing the buy flowers action, a get records component may retrieve e-commerce products based on an ID. The ID may be associated with flowers. In this regard, the get records component may query a data repository responsible for storing records about e-commerce products. The get records component may retrieve information about flowers that can be purchased based on an ID uniquely assigned to the flowers as an e-commerce product. In an embodiment, options for flowers may be presented to the user on the voice request application based on the information retrieved from the data repository. The user may select a particular set of flowers from the options of flowers to be sent to the client. The workflow may complete the purchase of the selected set of flowers. The flowers may be sent an address on file for client x.

It can be appreciated other type of actions such as contact account, buy coffee, or the like may be executed as described above.

After executing the steps for executing each type of action, the workflow may proceed to a compose response component. The compose response component may generate a response based on the user's request and executed steps. For example, the compose response component may generate a response for a new appointment scheduled for the user, in response to executing the steps for the next appointment action. In another example, the compose response component may prepare a response for generating a log of the call, in response to executing steps for the call wrap up action. This response may be transmitted to the voice request application and rendered on the user interface. The response may be a result of executing the desired action. For example, in response to scheduling a new appointment for the user, the information about the new appointment may be included in the response.

After the compose response component has prepared a response based on the user's request and executed steps, the workflow may proceed to create a JavaScript Object Notation (JSON) object component. The create JSON object component may create a JSON object for executing the desired action based on the user's request. For example, in response to the user requesting to schedule the next appointment, and after the entity/person for the next appointment has been identified, a JSON object may be created for scheduling the next appointment. Scheduling the next appointment may include updating the user's calendar and contacting the entity/person with whom the appointment is being scheduled.

As another example, in response to the user requesting navigation instructions for their next appointment and identifying the address of the next appointment, a JSON object may be created to generating and rendering navigation instructions for the user. The navigation instructions may be rendered on the device.

After the JSON object is created for executing the desired action, the workflow may proceed to the update records component. The update records component may update the records of a data repository based on the executed action.

FIGS. 8A-8B are lists of products that can be purchased at various vendors for the clients. FIG. 8A illustrates a list 800 of products available to be purchased for accounts. For example, a user may provide audio input as described above to purchase one of the products on the list 800. List 800 may be part of the community cloud platform, as shown in FIG. 1.

FIG. 8B illustrates a list 802 of vendors from which products may be purchased. For example, the platform which is configured to execute actions based on the audio input may interface with the vendors on list 802 to execute a commerce-based action. List 802 may be part of the community cloud platform, as shown in FIG. 1.

Figure 9:
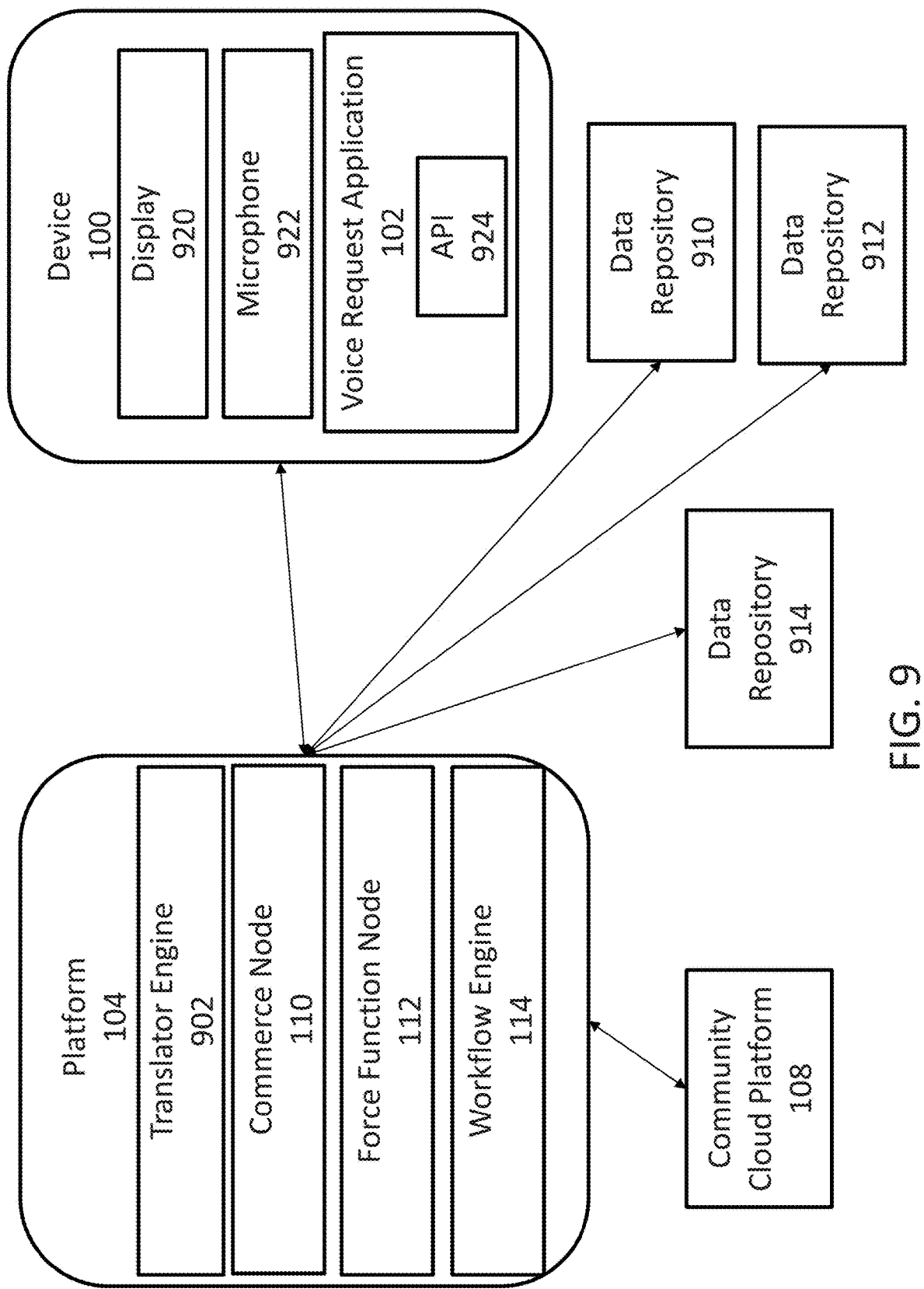
FIG. 9 is a block diagram of an example environment in which the system for executing an action based on audio input may be implemented according to an example embodiment.

FIG. 9 is a block diagram of an example environment in which a system for executing an action based on audio input may be implemented. The environment may include the platform 104, device 100, community cloud platform 108, and data repositories 910-914. The devices of the environment may be connected through wired connections, wireless connections, or a combination of wired and wireless connections.

As an example, platform 104, device 100, community cloud platform 108, and data repositories 910-914 can be connected through a network. The network may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The platform 104, community cloud platform 108, and data repositories 910-914 may reside fully or partially in a cloud computing environment. Alternatively, platform 104, community cloud platform 108, and data repositories 910-914 may reside outside or partially outside the cloud computing environment.

In an embodiment, the device 100 may include a display 920, microphone 922, and voice request application 102. The microphone 922 may capture audio input when operational. The voice request application 102 may include an API 924 configured to interface with the platform 104.

The platform 104 may include a translator 902, and a workflow engine 114. The data repositories 910-914 may various types of data. For example, data repository 910 may store information about users (e.g., territory sales employees). Data repository 912 may store information about accounts. Data repository 914 may store information about gifts or restaurants preferred by accounts.

The community cloud platform 108 may include vendors that have signed up with the community cloud platform 108. The community cloud platform 108 may be used to identify vendors or purchasing gifts, coffee, flowers, or the like. Data repository 914 may be incorporated in community cloud platform 108.

In an embodiment, the device 100 may be installed as a head unit (e.g., in a vehicle dashboard) in a vehicle. A user such as a territory sales employee may execute the voice request application 102 as described with respect to FIGS. 1A-1B. In response to executing the voice request application 102, the microphone 922 can become operational. The user may provide audio input in the form of a request. For example, the audio input may be "schedule my next appointment." The microphone 922 may capture the audio input. The audio input may be a recording or buffered voice file. The voice request application 102 may convert the audio input into a string. As described above, the voice request application 102 may use speech recognition software to convert the audio input into a string. The voice request application 102 may transmit the string to platform 104 using API 924.

In some embodiments, the voice request application 102 may transmit the audio input as an audio file to the platform 104. The platform 104 may convert the audio file to a string using speech-to-text capabilities. The string may be a transcription of the user's spoken word.

The platform 104 may receive the string, or convert the audio input into a string. The translator engine 902 may parse the string. The translator engine 902 includes natural language processing capabilities to parse the string. In an embodiment, the translator engine 902 may be its server or computing device. Alternatively, the translator engine 902 may reside on the platform 104.

The translator engine 902 may parse the string to generate the text query. In an embodiment, translation engine 302 may include language translation capabilities, such that string may be translated into a different language as a text query. The text query may include the text-translation of the spoken word received from the user. For example, the audio input from the user may be "new appointment." The translator engine 902 may parse this audio input into a string, including "new appointment." The translator engine 902 may use natural language processing capabilities to generate a request for scheduling a new appointment for the user.

In this regard, the translator engine 902 may generate a request based on the text query using the natural language processing capabilities. For example, the translator engine 902 may be able to understand the string and generate a request based on the string. The translator engine 902 may determine whether the request is a commerce-based request or a forced function based request based on the content of the request. For example, if the request is associated with purchasing a product, the translator engine 902 may determine the request is a commerce-based request. If the request is associated with finding the user's next sales opportunity, the request may be a forced function based request. In the event the request is a commerce-based request, the translator engine 902 may transmit the commerce-based request to commerce node 110. In the event the request is a forced function based request, the translator engine 902 may transmit the forced-function based request to forced function node 112. The commerce node 110 and forced function node 112 may format the request so that the workflow engine 114 properly processes the request. For example, the workflow engine 114 may implement the workflow shown in FIG. 7. The commerce node 110 may format the request so that the workflow engine 114 may direct the request to components in the workflow that may process commerce-based requests. Similarly, forced function node 112 may format the request so that the workflow engine 114 may direct the request to components in the workflow that may process the forced function based requests.

In some embodiments, the request may also include information about the user. For example, the request may include geolocation of the vehicle in which the user is traveling and a user identifier.

The workflow engine 114 may receive the request from the commerce node or the forced function node. The workflow engine 114 may identify an attribute associated with the user using the user identifier. For example, the workflow engine 114 may query the data repository 910 to retrieve an attribute associated with the user using the user identifier. The attribute associated with the user may include information associated with previously executed actions. For example, the attribute may include previously closed sales, sales experience, preferred vendors, preferred coffees, current client list, etc. In another example, the workflow engine 114 may identify an attribute associated with the vehicle's geolocation.

The workflow engine 114 may also identify a type of action requested by the user based on the request. The workflow engine 114 may identify a data repository based on the type of action requested by the user. In some embodiments, workflow engine 114 may identify a data repository based on the type of action requested by the user and the vehicle's geolocation. In other embodiments, the workflow engine 114 may query the identified data repository using the attribute associated with the user to retrieve information about the type of action requested to be executed by the user.

The workflow engine 114 may query the identified data repository using the vehicle's geolocation to retrieve information about an entity related to the type of action. The entity may a potential sales target, coffee shop, restaurant, vendor, hotel, etc. As such, if the type of action is scheduling the next appointment, the workflow engine 114 may query the identified data repository to identify a potential sales target. On the other hand, if the type of action is making a reservation, the workflow engine 114 may identify a potential restaurant.

The workflow engine 114 may match elements of previously executed actions associated with the user and elements of the information about the entity. For example, the platform 104 may use the user's sales history and compare the elements of the sales history (e.g., type of sale, amount of sales, type of clients the user works with, experience level, etc.) and match the elements the elements associated of the entity's information (e.g., potential amount of sale, type of entity, whether the entity has been a client before, etc.). The user may determine that based on the elements of the entity's information, a user may require a given amount of experience with closing sales of a given amount. The platform 104 may determine that the user's elements match the amount of experience in closing sales of the given amount. In this regard, the platform 104 may determine that recommended action is scheduling the appointment with the entity.

The workflow engine 114 may identify a recommended action for the user based on the information about the type of action and execute the recommended action for the user. A result of the executed action may be rendered on the display 920 of the device 100.

In an embodiment, the translator engine 902 may parse the audio input and identify keywords from the audio input. For example, the audio input may be "schedule my next appointment." The translator engine 902 may identify "schedule" and "appointment." The translator engine 902 may pass these keywords to the workflow engine 114. The workflow engine 114 may identify the type of action requested by the user based on the keywords. Furthermore, the workflow engine 114 may generate a request based on the keywords.

The workflow engine 114 may interface with the engagement platform 104 to execute the desired action. In an embodiment, if the desired action is a commerce-based action, the engagement platform 104 may interface with the community cloud platform 108 to execute the action. The community cloud platform 108 may interface with third-party vendors to purchase products such as flowers, gifts, coffee, make restaurant reservations, or the like.

In some embodiments, the desired action may include multiple sub-actions. For example, in the event the desired action is scheduling the next appointment at a restaurant, the workflow engine 114 may schedule the next appointment while also making reservations at a restaurant at a desired time.

As a non-limiting example, the user may be a territory sales employee traveling to meet accounts in various locations. The territory sales employee may be traveling to various locations. One of the territory sales employee's meetings may end earlier than scheduled or may get canceled. This may lead to the territory sales employee to have free time before the next scheduled appointment. The territory sales employee may want to schedule a new appointment before the next scheduled appointment.

The territory sales employee may execute the voice request application 102 on the device 100. The territory sales employee may provide an audible input, "Schedule a new appointment." The API 924 may transmit the audio input as a platform event to the platform 104.

The translator engine 902 may parse the audio input from audio to a string to generate a text query. The translator engine 902 may use natural language processing capabilities to generate a request based on the audio input. The request may be in a format accepted by the workflow engine 114 so that the workflow engine 114 may schedule a new appointment for the territory sales employee. Alternatively, the translator engine 902 may parse the string to identify keywords from the string, such as "new" and "appointment." The translator engine 902 may pass the request or keywords to the workflow engine 114. In the event, the workflow engine 114 receives the keywords, the workflow engine 114 may generate a request to be processed.

The workflow engine 114 may identify a type of request based on the request or keyword. In this example, the workflow engine 114 may identify that the type of request is scheduling a new appointment. The workflow engine 114 may identify which data repositories to query to execute the action of scheduling a new appointment based on the type of action. In this example, the workflow engine 114 may identify data repository 910, which stores information about the territory sale employee and data repository 912, which stores information about accounts. The workflow engine 114 may identify attributes associated with the territory sales employee based on information about the territory sales employee retrieved from data repository 910. For example, the attributes may include the type of current schedule, sales history, experience, or the like. Additionally, the API 924 may transmit a geolocation (or geographical positioning system (GPS) location) along with the audio input to the platform 104. As an example, the device 100 may include a geolocation engine that captures the current geolocation of the vehicle.

The workflow engine 114 may identify the time of the next scheduled appointment for the territory sales employee and the location of the next scheduled appointment, so that the workflow engine 114 may schedule the new appointment for the territory sales employee so that the territory sales employee may reach the next scheduled appointment on-time.

The workflow engine 114 may query data repository 912 to retrieve information about accounts. The workflow engine 114 may identify an account for scheduling the new appointment based on the location of the account, sales opportunity (lead score), availability of the account, the current location of the territory sale employee, location of the next scheduled appointment, or the like. The workflow engine 114 may schedule a new appointment with the identified account. The workflow engine 114 may update the territory sales employee in the data repository 910 with the new appointment and may contact the account (e.g., via email or messaging service). The workflow engine 114 may render information about the new appointment on the display 920 of the device 100, on a user interface generated by the voice request application 102.

In another non-limiting example, the territory sales employee may execute the voice request application 102 on the device 100. The territory sales employee may provide an audible input "Purchase flowers for account x." The API 924 may transmit the audio input as a platform event to the platform 104.

The translator engine 902 may parse the audio input from audio to a string to generate a text query. The translator engine 902 may use natural language processing capabilities to generate a request based on the audio input. The request may be in a format accepted by the workflow engine 114 so that the workflow engine 114 may schedule a new appointment for the territory sales employee. Alternatively, the translator engine 902 may parse the string to identify keywords from the string, such as "flowers" and "purchase." The translator engine 902 may pass the request or keywords to the workflow engine 114. In the event, the workflow engine 114 receives the keywords, the workflow engine 114 may generate a request to be processed.

The workflow engine 114 may identify a type of request based on the request or keyword. In this example, the workflow engine 114 may identify that the type of request is purchasing flowers for an account. The workflow engine 114 may identify which data repositories to query to execute the action of scheduling a new appointment based on the type of action. In this example, the workflow engine 114 may identify data repository 912, which stores information about accounts and data repository 316, which stores information about vendors for flowers (e.g., flower.com).

The workflow engine 114 may query the data repository 912 to identify information about the account. The information may include address, types of flowers preferred by the account, budget to spend on the flowers, last time flowers were sent to the client, or the like. The workflow engine 114 may query the data repository 914 to identify a flower vendor. The data repository 914 may include a list of products and a list of selling the products. In this example, the workflow engine 114 may retrieve information about flowers for sale by particular vendors.

The workflow engine 114 may interface with the engagement platform 104 to execute the purchase and delivery of the flowers. The engagement platform 104 may interface with the cloud community platform 108, which in turn will interface with the flower vendor to execute the purchase and delivery of the flowers. The workflow engine 114 may identify bouquets or products to send to the client based on the information retrieved about the account.

In an embodiment, the workflow engine 114 may purchase and request delivery identified bouquets or products from the flower vendor to the account, by interfacing with the cloud community platform 108. The delivery may be to the address for account x, which is retrieved from the data repository 912. The workflow engine 114 may render information about the new flower purchase and delivery on the display 920 of the device 100, on a user interface generated by the voice request application 102.

In another embodiment, the workflow engine 114 may render a selection of products or bouquet from the flower vendor on the display of the devices on the user interface generated by the voice request application 102. The territory sale employee may select a product or bouquet from the selection to purchase and deliver the account. The workflow engine 114 may receive the selection from the API 924. The workflow engine 114 may complete the purchase and delivery to the account by interfacing with the engagement platform 104, and community cloud platform 108.

It can be appreciated the territory sales employee may also make requests such as purchasing a coffee for the account ahead of an upcoming meeting, making reservations at a nearby restaurant ahead of an upcoming meeting with the account, purchasing gifts for the account, or the like, using the process described above.

In some embodiments, device 100 may output audio data indicating the result of the executed action. For example, the result of the executed action may be rendered on user interface 202. Device 100 may convert the text of the result of the executed action into audio data using "text-to-speech" software and output the audio data.

In some embodiments, device 100 may render on user interface 202 or output the result of multiple executed actions. For example, in the event the executed actions include scheduling the next appointment and identifying navigation directions to the appointment, device 100 may render on user interface 202 or output a confirmation of the scheduled appointment as well as navigation directions to the next appointment.

In another example, in the event the executed actions include scheduling the next appointment at a restaurant, device 100 may render on user interface 202 or output a confirmation of the scheduled appointment, a confirmation of the reservation at a restaurant, as well as navigation directions to the restaurant.

In some embodiments, the system for executing an action based on audio input may be implemented using a blockchain system. The blockchain system may be a distributed ledger made up of a sequence of blocks. Each block may include data associated with a given event and a hash value corresponding to the previous blocks. The blockchain system may also include side chains. The ledger of the blockchain system may be distributed across multiple nodes. Each node may verify each new block added to the sequence of blocks in the blockchain system.

Data associated with each event in the system for executing an action based on audio input may be included in a new block of the blockchain system. A new sequence of blocks may be generated for each new audio input. For example, in response to the platform 104 receiving an audio file of the audio input, a new block in the sequence of blocks may be generated, including the audio file. In response to the translator engine 902 converting the audio file into a string, a new block may be generated in the sequence of blocks, including the string. In response to the commerce node 110 or force function node 112 generating a request based on the string, to be forwarded to the workflow engine 114, a new block may be generated in the sequence of blocks, including the request. Furthermore, in response to the workflow engine 104 forwarding the request to the appropriate components for processing the request, a new block may be generated, including the operation performed by the respective component.

Figure 10:
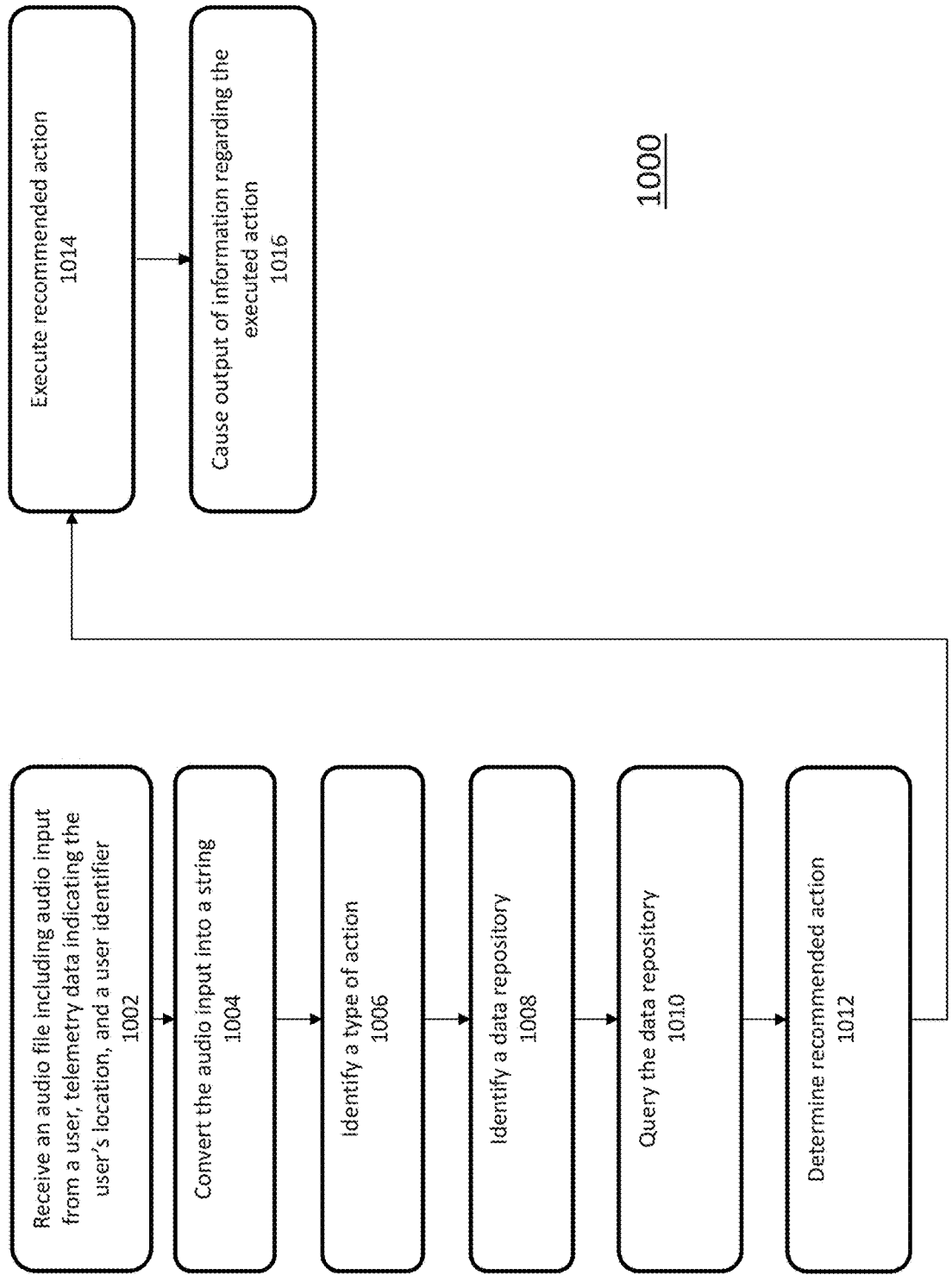
FIG. 10 is a flowchart illustrating the process of executing an action for a user based on audio input in accordance with an example embodiment.

FIG. 10 is a flowchart 1000 illustrating the process of executing an action for a user based on audio input in accordance with an example embodiment. It is to be appreciated the operations may occur in a different order, and some operations may not be performed. Merely as an example, the flow of data will be described with respect to FIGS. 1-9.

In operation 1002, the platform 104 receives an audio file including audio input from a user, telemetry data indicating the user's location, and a user identifier. The platform 104 may receive the audio file from the voice request application 102. The voice request application may be installed on a device such as a head unit of a vehicle being operated by the user. The device may include a microphone that may capture the audio input. The user may be a territory sales employee that needs to execute an action while the user is en route to an appointment. The user may use the voice request application to request the execution of the action using audio input. The voice request application 102 may transmit the audio input to the platform 104 as an audio file. The voice request application 102 may also transmit information about the user, such as a user identifier and telemetry data or geolocation of the vehicle along with the audio file.

In operation 1004, the platform 104 converts the audio input into a string representing a transcription of contents of the audio input. The platform 104 may use a speech recognition software to convert the audio input into a string. The string may be a transcription of the audio input of the user.

In operation 1006, the platform 104 identifies a type of action based on content of the string. The platform 104 may convert the string into a request using natural language processing. The type of action is determined using the request. Alternatively, the translator may parse the string to identify content of the string, such as a keyword. The type of action may be determined based on the keyword. The type of action may be "schedule an appointment," "purchase a gift," "make reservations," or the like.

In operation 1008, the platform 104 identifies a data repository based on the type of action. For example, if the type of action is "scheduling an appointment," the platform may identify a data repository associated with accounts for the next appointment. Alternatively, if the type of action is "making reservations," the platform may identify the data repository for restaurants near the location of the account.

In operation 1010, the platform 104 queries the identified data repository corresponding to the type of action, using the telemetry data indicating the user's location to retrieve information about an entity related to the type of action. For example, if the type of action is scheduling the next appointment, the platform may query the identified data repository using the location of the user to retrieve the account that may be within a given vicinity of the user's location. Furthermore, the platform may query the identified data repository for accounts based on the user's sales information.

In operation 1012, the platform 104 determines a recommended action corresponding to the type of action by matching a threshold of elements of previously executed actions associated with the user and elements of the information about the entity. For example, the platform 104 may use the user's sales history and compare the elements of the sales history (e.g., type of sale, amount of sales, type of clients the user works with, experience level, etc.) and match the elements the elements associated of the entity's information (e.g., potential amount of sale, type of entity, whether the entity has been a client before, etc.). The user may determine that based on the elements of the entity's information, a user may require a given amount of experience with closing sales of a given amount. The platform 104 may determine that the user's elements match the amount of experience in closing sales of the given amount. In this regard, the platform 104 may determine that recommended action is scheduling the appointment with the entity.

In operation 1014, the platform 104 executes the recommended action by interfacing with the entity. For example, the platform may schedule an appointment for the user with an account. As another example, the platform may purchase a product for the user or make a restaurant reservation for the user.

In operation 1016, the platform 104 causes output of information regarding the recommended action may be rendered on a display of the device. The information may be identification information about the account and a route to the next appointment. The route may be rendered on a map. The output may be audio output or visual output by user interface 202.

Figure 11:
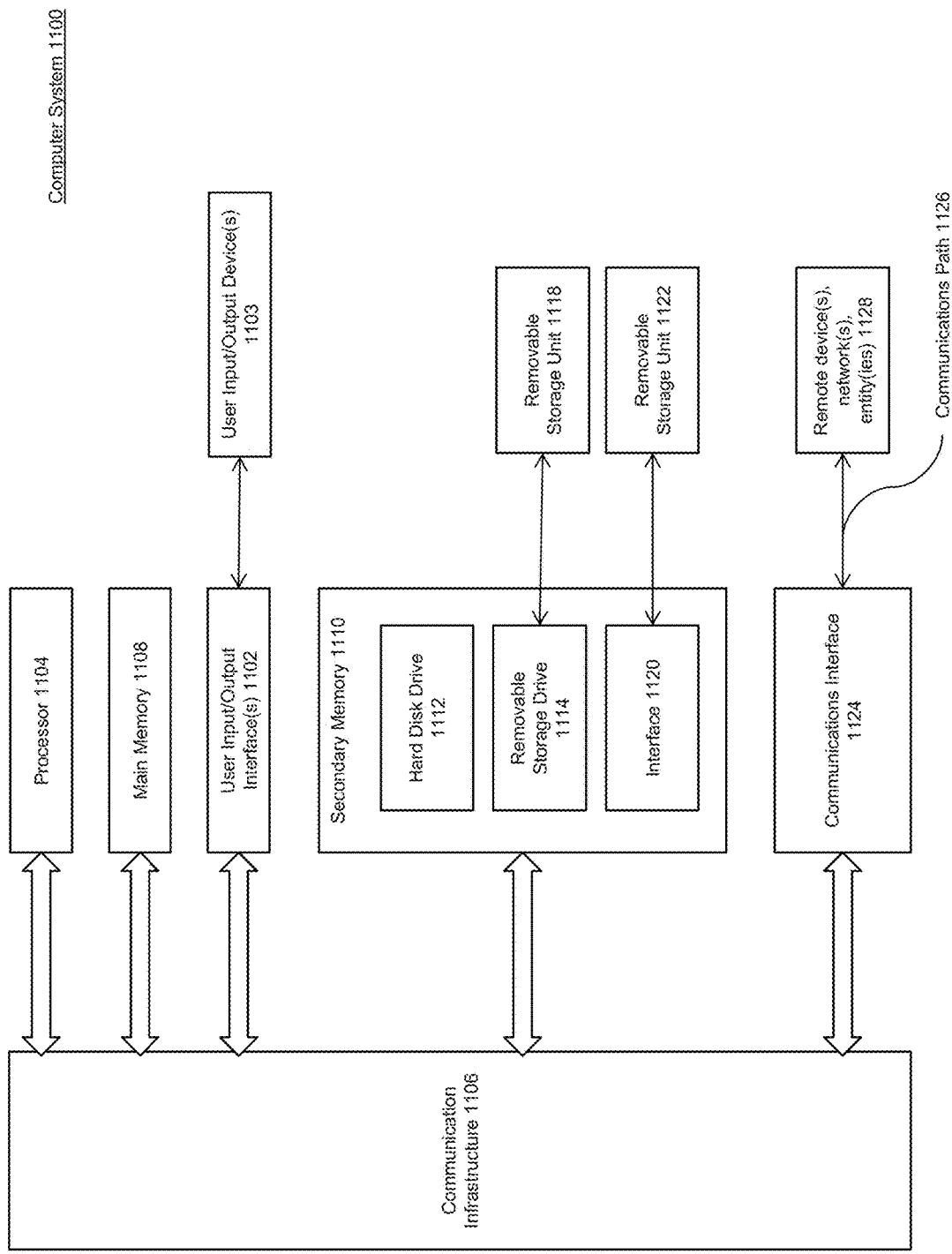
FIG. 11 is a block diagram of example components of a computing system according to an embodiment.

FIG. 11 is a block diagram of example components of device 1100. One or more computer systems 1100 may be used, for example, to implement any of the embodiments discussed herein, as well as combinations and sub-combinations thereof. Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 308, such as random access memory (RAM). Main memory 1108 may include one or more levels of cache. Main memory 308 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114.

Removable storage drive 1114 may interact with a removable storage unit 1118. Removable storage unit 1118 may include a computer usable or readable storage device having stored thereon computer software (control logic) and/or data. Removable storage unit 1118 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the present disclosure will so fully reveal the general nature of the present disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the present disclosure, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A computer-implemented method, comprising:
   receiving, by one or more computing devices, an audio file including audio input from a user, telemetry data indicating a location of the user, and a user identifier;
   converting, by the one or more computing devices, the audio input into a string representing a transcription of the audio input;
   identifying, by the one or more computing devices, a type of action to be executed based on content of the string;
   querying, by the one or more computing devices, a data repository corresponding to the type of action, using the telemetry data indicating the location of the user to retrieve information about an entity related to the type of action;
   comparing elements of previous performance associated with the user to elements of the information about the entity;
   determining, based on the comparing, that at least a threshold of the elements of the previous performance associated with the user match the elements of the information about the entity;
   generating, by the one or more computing devices, a recommended action corresponding to the type of action based on the determining; and
   executing, by the one or more computing devices, the recommended action for the user by interfacing with the entity,
   wherein the elements of the previous performance associated with the user include a sales history of the user, and
   wherein the elements of the information about the entity include potential sale amount, type of entity, and entity purchase history.

2. The method of claim 1, further comprising identifying, by the one or more computing devices, a keyword from the request, wherein the type of action is determined based on the keyword.

3. The method of claim 1, further comprising identifying, by the one or more computing devices, the data repository to query based on the type of action.

4. The method of claim 1, wherein the audio input is captured by a device installed in a vehicle of the user.

5. The method of claim 1, wherein the recommended action includes navigating to a destination.

6. The method of claim 5, further comprising causing display, by the one or more computing devices, of navigation instructions for the destination on a user interface.

7. The method of claim 1, further comprising causing output, by the one or more computing devices, of information associated with the recommended action on a user interface, wherein the output at least one of an audio output or a visual output.

8. A system comprising:
   a memory; and
   a processor coupled to the memory, the processor configured to:
   receive an audio file including audio input from a user, telemetry data indicating a location of the user, and a user identifier;
   convert the audio input into a string representing a transcription of the audio input;
   identify a type of action to be executed based on content of the string;
   query a data repository corresponding to the type of action, using the telemetry data indicating the location of the user to retrieve information about an entity related to the type of action;
   compare elements of previous performance associated with the user to elements of information about the entity;
   determine, based on the comparing, that at least a threshold of the elements of the previous performance associated with the user match the elements of the information about the entity;
   generate a recommended action corresponding to the type of action based on the determining; and
   execute the recommended action for the user by interfacing with the entity,
   wherein the elements of the previous performance associated with the user include a sales history of the user, and
   wherein the elements of the information about the entity include potential sale amount, type of entity, and entity purchase history.

9. The system of claim 8, wherein the processor is further configured to identify a keyword from the request, wherein the type of action is determined based on the keyword.

10. The system of claim 8, wherein the processor is further configured to identify the data repository to query based on the type of action.

11. The system of claim 8, wherein the output is an audio output or a visual output.

12. The system of claim 8, wherein the recommended action includes navigating to a destination.

13. The system of claim 12, wherein the processor is further configured to cause display of navigation instructions for the destination on a user interface.

14. A non-transitory computer-readable device having instructions stored thereon that, when executed by at least one computing device, cause the at least one computing device to perform operations comprising:

receiving an audio file including audio input from a user, telemetry data indicating a location of the user, and a user identifier;

converting the audio input into a string representing a transcription of the audio input;

identifying a type of action to be executed based on content of the string;

querying a data repository corresponding to the type of action, using the telemetry data indicating the location of the user to retrieve information about an entity related to the type of action;

comparing elements of previous performance associated with the user to elements of the information about the entity;

determining, based on the comparing, that at least a threshold of the elements of the previous performance associated with the user match the elements of the information about the entity;

generating a recommended action corresponding to the type of based on the determining; and executing the recommended action for the user by interfacing with the entity, wherein the elements of the previous performance associated with the user include a sales history of the user, and wherein the elements of the information about the entity include potential sale amount, type of entity, and entity purchase history.

15. The non-transitory computer-readable device of claim 14, the operations further comprising identifying the data repository to query based on the type of action.

16. The non-transitory computer-readable device of claim 14, the operations further comprising identifying a keyword from the request, wherein the type of action is determined based on the keyword.

17. The non-transitory computer-readable device of claim 14, the operations further comprising causing output of information associated with the recommended action on a user interface, wherein the output at least one of an audio output or visual output.

* * * * *